Jan. 13, 1970     C. G. ERICKSON     3,488,865
READING PACER
Filed Nov. 14, 1967
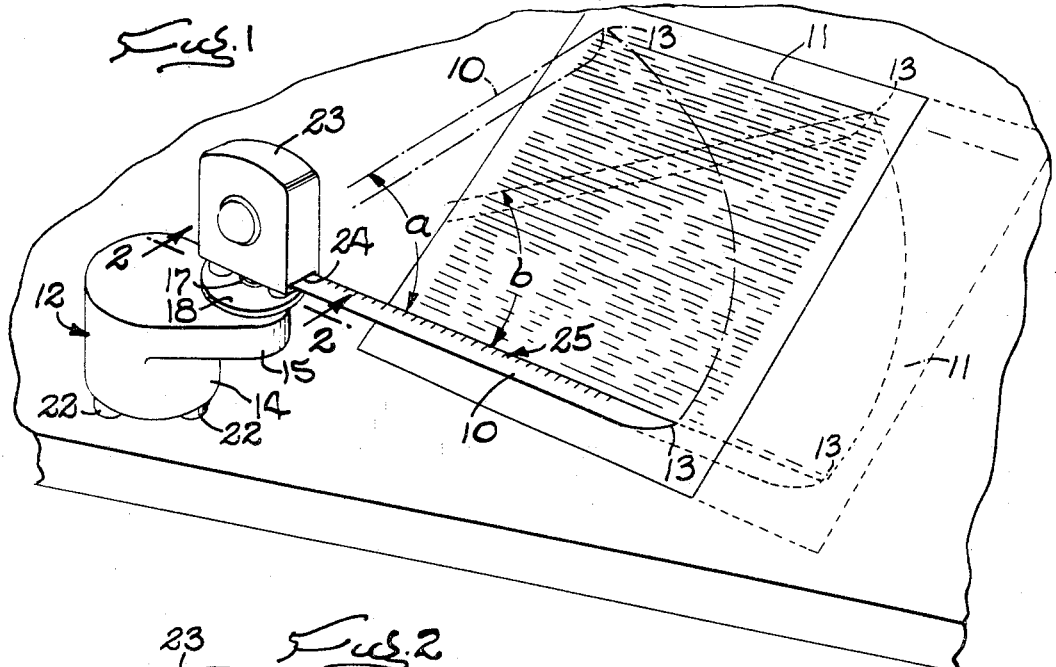
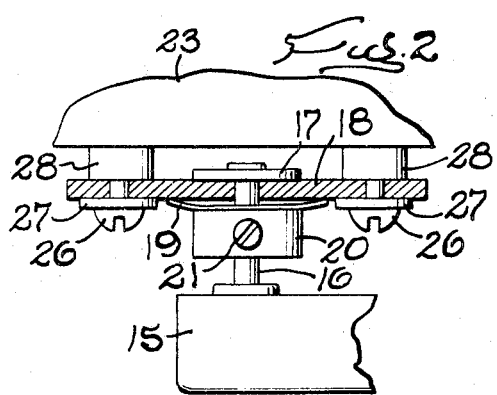
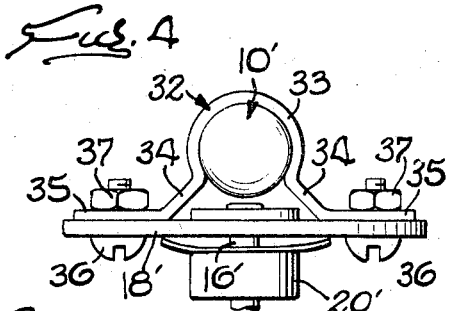
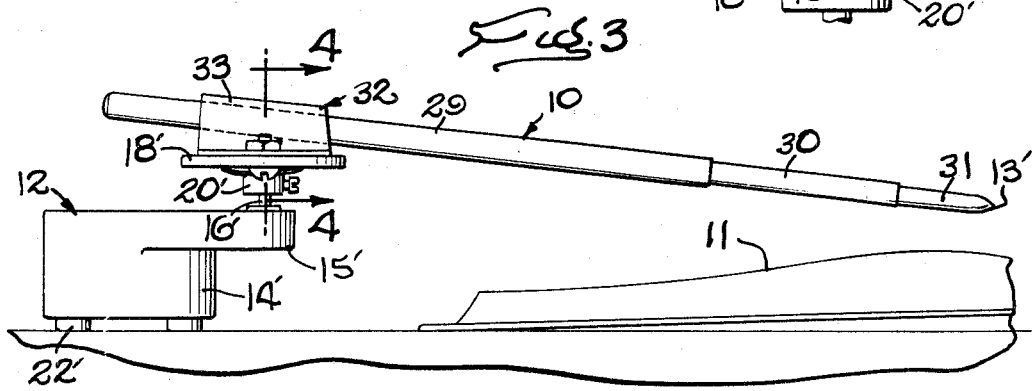
INVENTOR
Clifford G. Erickson
by Wolfe, Hubbard, Voit & Osann
ATTORNEYS

United States Patent Office

3,488,865
Patented Jan. 13, 1970

3,488,865
READING PACER
Clifford G. Erickson, Rockford, Ill.
(121 Windsor Drive, Carlos, Calif.)
Filed Nov. 14, 1967, Ser. No. 682,767
Int. Cl. G09b *17/04;* B41j *11/64*
U.S. Cl. 35—35                                        7 Claims

ABSTRACT OF THE DISCLOSURE

A reading pacer in which the guide is an extensible member which turns at a constant angular speed and the end of the member traverses the page to be read to serve as a pointer for guiding the reader. The speed at which the pointer end moves is selected by the amount the guide member is extended.

BACKGROUND OF THE INVENTION

This invention relates to a reading pacer in which a guide traverses a page from top to bottom at selected speeds so that the user endeavors to keep pace with the guide and increases his reading speed by increasing the speed of the guide. In prior devices, the guide remains parallel with the lines of the written material and moves edgewise along a straight line. Such arrangement usually require motion converting and speed changing mechanisms.

SUMMARY OF THE INVENTION

The present invention aims to provide a comparatively simple and inexpensive reading pacer by eliminating the need for the motion converting and speed changing mechanisms. This is achieved by using an elongated extensible member as the guide and turning the guide at a constant angular speed so that only the end of the member guides the reader. The speed at which this end moves across the page may be varied simply by changing the amount the guide member is extended.

BRIEF DESCRIPTION OF THE DRAWINGS

FIGURE 1 is a perspective view of a reading pacer embodying the present invention.

FIG. 2 is an enlarged fragmentary sectional view taken along line 2—2 in FIG. 1.

FIG. 3 is a side elevational view of a modified form of the invention.

FIG. 4 is an enlarged sectional view taken along the line 4—4 in FIG. 3.

DETAILED DESCRIPTION OF THE PREFERRED EMBODIMENTS

As shown in the drawings for purposes of illustration, the invention is embodied in a reading pacer comprising a guide member 10 which is moved across a page 11 of written material at selected speeds by a power actuator 12. The pacer is used to increase a person's reading speed and, for this purpose, the person aims to read at the same speed as the guide member moves across the page. As the reading ability improves, the guide member is moved at increasing speeds to train the person to read progressively faster.

In prior reading pacers, the guide 10 has been maintained parallel to the lines of written material on the page 11 and has moved edgewise in a straight line from the top of the page to the bottom to cover or uncover successive lines. This has entailed the use of comparatively complex mechanisms to convert what usually is a rotary motion of the power actuator 12 to a rectilinear motion for the guide and also to change the speed at which the guide moves.

I have discovered that it is not necessary to cover or uncover lines of written material and that a pointer moving from line to line is just as effective for training purposes. Based on this discovery, the present invention contemplates using an extensible member as the guide 10 with the end 13 of the member constituting a pointer. The member 10 swings at a constant arcuate speed but the actual speed that the end or pointer 13 moves across the page 11 depends upon the amount that the member 10 has been extended. This permits the use of a constant speed power actuator 12 and eliminates motion converting and speed changing mechanisms.

In the form of the invention illustrated in FIGS. 1 and 2, the power actuator includes a constant speed electric motor 14 which drives the input end of a conventional speed reducer 15. The output of the speer reducer drives a vertical shaft 16 (FIG. 2) continuously and at a constant speed. Rigidly attached to the upper end of the shaft is a washer 17 and a circular plate 18 is loosely received on the shaft beneath the washer 17 to serve as a support for the extensible member 10. The plate 18 is held against the underside of the washer 17 by a spring washer 19 which acts between the underside of the plate and a collar 20 which is fixed to the shaft 16 by a set screw 21. The spring 19 holds the plate 18 in frictional engagement with the washer 17 so that normally the plate turns with the shaft 16 but the plate may be turned relative to the shaft to set the pacer as will be described later. Preferably, a plurality of feet 22 (FIG. 1) are attached to the bottom of the housing of the motor 14 and serve as a base for the pacer.

In this instance, the extensible member 10 is a self-supporting tape much like the ordinary steel tape measure. Thus, the tape 10 is coiled within a housing 23 with the end 13 of the tape projecting out through a slot 24 in the housing. The end 13 is tapered as shown in FIG. 1 to serve as a more distinct pointer. Inscribed on the face of the tape 10 are indicia 25 which may be calibrated in words per minute of a standard work or which may be numbers convertible to words per minute for various works. The tape housing 23 is mounted on the plate 18 by screws 26 (FIG. 2) which project up through washers 27, the plate 18 and spacers 28 and are threaded into the underside of the tape housing.

With the foregoing arrangement, the tape 10 is unwound from the housing 23 until the indicium at the slot 24 corresponds to the reading speed selected by the reader. Then the pacer is placed to the left of the page 11 and just below the last line and the tape housing is turned to locate the pointer end 13 of the tape at the top line of the page the dot-dash position illustrated in FIG. 1. Such turning of the housing is permitted by the frictional connection between the plate 18 and the washer 17. The motor 14 is energized and the tape swings through the angle *a* during which the end or pointer 13 traverses the page 11 from top to bottom and the reader endeavors to keep pace with the pointer. When a new page is substituted, it is not necessary to stop the motor 14 since the housing 23 may be swung back to the starting position while the shaft 16 is turning. The further the tape 10 is extended, the faster will be the reading speed. For example, if the tape is extended to the dotted line position shown in FIG. 1, the tape end 13 traverses the page 11 as the tape swings through the angle *b*. Since this angle is smaller than the angle *a*, the pointer traverses the page in less time. Although the tape end 13 moves through an arc and does not traverse the page at a precisely uniform speed, the pace is close enough to a uniform speed to be perfectly acceptable as a training aid. Moreover, as the tape is extended further, the pace more closely approximates a uniform speed.

FIGS. 3 and 4 illustrate a modified form of the invention in which the corresponding parts are indicated by the same but primed reference characters. In this case, the tape 10 is replaced by a telescoping assembly 10 which herein comprises three telescoping elements 29, 30 and 31. The inner element 29 is mounted on the plate 18' by means of a bracket 32 which includes a partial cylindrical portion 33 extending more than 180 degrees around the element 29. Extending downwardly and laterally from the cylindrical portion 33 are legs 34 (FIG. 4) which terminate in flanges 35 abutting the top of the plate 18'. The flanges are secured to the plate by bolts 36 projecting upwardly through the plate and the flanges and held in place by nuts 37. The axis of the cylindrical portion 33 is inclined downwardly to place the pointer end 13' on the element 31 closer to the page to be read. The elements 30 and 31 are inscribed with indicia (not shown) similar to the indicia 25 to indicate reading speed. As will be apparant, the reading speed may be adjusted selectively by extending the telescoping elements 30 and 31.

It will be observed that a reading pacer construed in accordance with the present invention is, as compared with prior pacers, simple and inexpensive. At the same time, the pacer is a fully effective training aid.

I claim as my invention:

1. A reading pacer comprising a power actuator having a rotating output shaft adapted to turn at a predetermined constant speed, a support coupled to said shaft to turn bodily with the latter, and an elongated member carried by said support and projecting generally radially of said shaft, the end of said member constituting a pointer adapted to traverse a page of written material, said member being selectively extensible whereby the end of the member traverses the page faster as the member is extended further.

2. A reading pacer as defined in claim 1 whereby said elongated member is a self-supporting tape and said pacer includes means on said support for storing said tape whereby the tape is extended by being progressively moved out of said storing means.

3. A reading pacer as defined in claim 1 wherein said elongated member includes at least two slidably telescoping elements whereby said member is extended by sliding one of said elements relative to the other.

4. A reading pacer as defined in claim 1 in which said power actuator includes a constant speed electric motor and a speed reducer having an input driven by said motor and an output connected to said shaft.

5. A reading pacer having, in combination, a power actuator having a rotating output shaft adapted to turn at a predetermined constant speed, a housing coupled to said shaft to turn bodily therewith, and a substantially self-supporting flexible tape wound within said housing and having an outer end projecting out of the housing to permit the tape to be selectively extended generally radially of said shaft by unwinding the tape from the housing, said outer end constituting a pointer adapted to traverse a page of written material and being operable to traverse the page at progressively faster speeds as said tape is unwound from said housing.

6. A reading pacer as defined in claim 5 in which said power actuator includes a constant speed electric motor and a speed reducer having an input driven by said motor and an output connected to said shaft.

7. A reading pacer comprising a power actuator having a rotating output shaft adapted to turn at a predetermined constant speed, a support, a friction coupling connecting said support to said shaft and normally operable to turn the support bodily with the shaft, and an elongated member carried by said support and projecting generally radially of said shaft, the end of said member constituting a pointer adapted to traverse a page of written material, said member being selectively extensible whereby the end of the member traverses the page faster as the member is extended further and said friction coupling permitting said support to be turned relative to said shaft and locate said end at a starting point.

References Cited

UNITED STATES PATENTS

| 2,388,736 | 11/1945 | Germain | 116—119 |
| 2,539,687 | 1/1951 | Barsotti | 116—119 |
| 2,568,577 | 9/1951 | Alexander. | |
| 3,021,751 | 2/1962 | Barnette. | |

EUGENE R. CAPOZIO, Primary Examiner

W. H. GRIEB, Assistant Examiner

U.S. Cl. X.R.

40—353